United States Patent [19]
Ergenc

[11] 3,986,343
[45] Oct. 19, 1976

[54] APPARATUS AND PROCESS FOR DEUTERIUM EXCHANGE

[75] Inventor: Mehmet Sahabettin Ergenc, Zollikerberg, Switzerland

[73] Assignee: Sulzer Brothers Limited, Winterthur, Switzerland

[22] Filed: Jan. 23, 1975

[21] Appl. No.: 543,487

[30] Foreign Application Priority Data
Feb. 8, 1974  Switzerland................. 1755/74

[52] U.S. Cl.................................. 62/101; 62/335
[51] Int. Cl.²..................... F25B 15/00; F25B 7/00
[58] Field of Search.............. 62/101, 79, 335, 32

[56] References Cited
UNITED STATES PATENTS

| | | | |
|---|---|---|---|
| 2,182,453 | 12/1939 | Sellew | 62/335 |
| 2,464,072 | 3/1949 | Cornelius | 62/101 |
| 2,712,738 | 7/1955 | Wucherer et al. | 62/32 |
| 2,820,352 | 1/1958 | Fokker et al. | 62/32 |
| 2,975,606 | 3/1961 | Karwat | 62/32 |
| 3,483,710 | 12/1969 | Bearint | 62/101 |
| 3,817,050 | 6/1974 | Alexander | 62/101 |

*Primary Examiner*—Lloyd L. King
*Attorney, Agent, or Firm*—Kenyon & Kenyon Reilly Carr & Chapin

[57] ABSTRACT

The deuterium exchange plant is combined with an absorption refrigeration plant in order to improve the exchange process and to produce refrigeration. The refrigeration plant has a throttling means for expanding and cooling a portion of the liquid exchange medium separated in the exchange plant as well as an evaporator, in which the said liquid exchange medium is brought into heat exchange with a cold consumer device, absorption means for forming a solution of the used exchange medium and fresh water and a pump for pumping the solution into the exchange plant.

2 Claims, 2 Drawing Figures

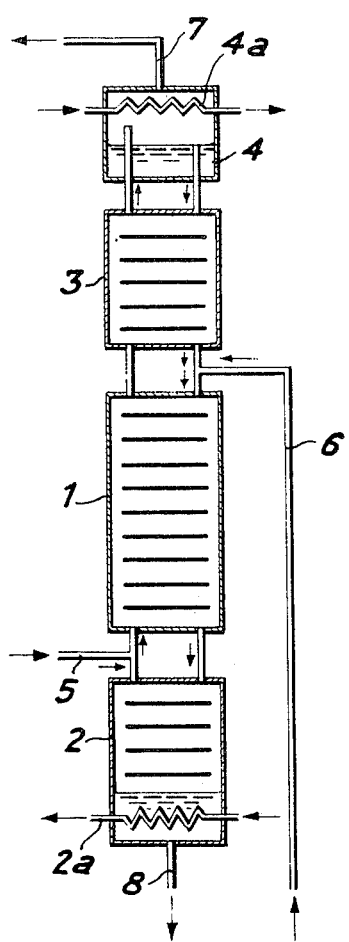
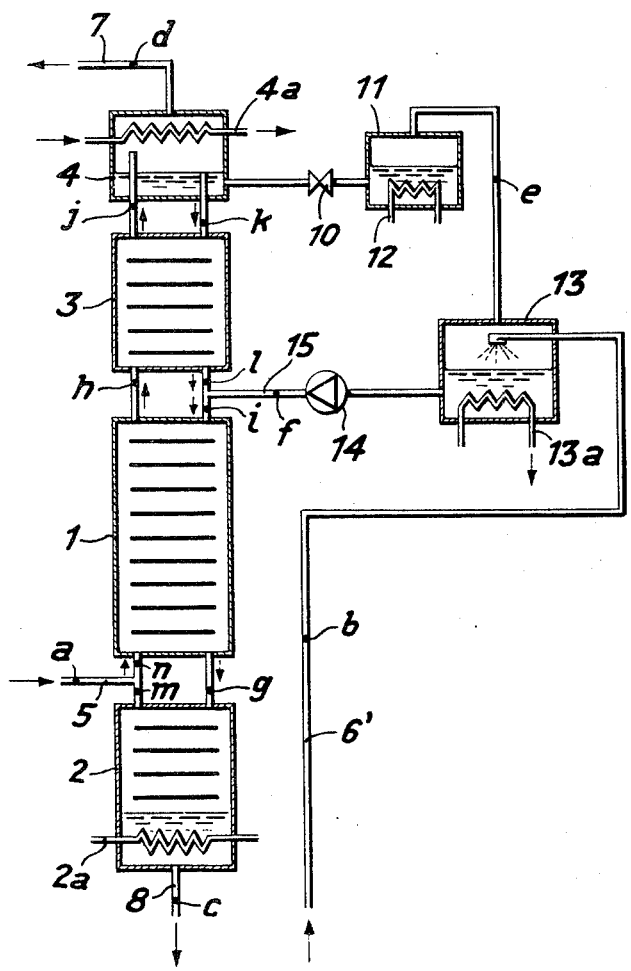
Fig. 1 PRIOR ART
Fig. 2

APPARATUS AND PROCESS FOR DEUTERIUM EXCHANGE

This invention relates to an apparatus and process for deuterium exchange particularly between water and a watersoluble exchange medium.

Various structures and processes have been known for deuterium enrichment wherein water and a water-soluble exchange medium have been used with one or the other being initially enriched in deuterium. Generally, the exchange medium and the water are separated from one another by rectification with some of the water being evaporated to serve as a flow of the rising vapor while the exchange medium separated from the water is condensed for use as reflux liquid. The apparatus for performing the process usually consists of at least one exchange tower through which water and the exchange medium flow, a rectifying column for separating the water from the exchange medium, and an evaporator for producing the flow of rising vapor, a rectifying column for separating the exchange medium from the water and a condenser for producing the reflux liquid consisting of exchange medium. In such processes, either the low-deuterium-content exchange medium or the low-deuterium-content water is enriched in deuterium depending on whether the water or exchange medium has the higher deuterium concentration as deuterium source.

The object of the invention is to combine the known deuterium exchange process with a process for producing refrigerant for a refrigeration means outside the plant in order to improve the economy of the known exchange process wherever it is desired additionally to produce refrigerant.

Briefly, the invention combines a deuterium exchange plant and an absorption refrigeration plant.

The deuterium exchange plant generally includes at least one exchange tower for countercurrent flow of water and a water soluble exchange medium, a first rectifying column for separating water from the exchange medium, an evaporator for producing a flow of rising vapor, a second rectifying column for separating exchange medium from the water and a condenser for producing a reflux liquid consisting of exchange medium.

The refrigeration plant includes a throttling means to expand a flow of liquid exchange medium flowing from the condenser, an evaporator for evaporating the expanded flow of exchange medium, an absorption means for comingling the evaporated exchange medium with water to form a solution, cooling means for dissipating solution heat and a pump for pumping the solution to the exchange tower of the exchange plant at a predetermined pressure, i.e. the process pressure.

The rectifying columns, condenser and evaporator of the exchange plant thus simultaneously function as components of the refrigeration plant.

The process of the invention includes the steps of creating an isotope exchange between water and a water-soluble exchange medium with one of the water and exchange medium being deuterium enriched, rectifying the water and exchange medium to separate the two from each other, evaporating the separated water to form a flow of rising vapor while condensing the separated exchange medium to form a reflux liquid, expanding a portion of a condensed exchange medium to cool the portion, placing the cooled exchange medium portion in heat exchange relation with a cold consumer to evaporate the exchange medium, forming a solution of the evaporated exchange medium portion and water while dissipating the solution heat and supplying the solution as the water in the isotope exchange step at a predetermined pressure.

The invention is based on the finding that an improved economy is obtained if the thermal power necessarily applied in the known deuterium exchange process is utilized for producing cold, that is a refrigerant, for a cold-consuming device such as a refrigerating means. The thermal power consists in the heating capacity required to produce the flow of the rising vapor using an extraneous heating source, for example heating system, and the refrigerating capacity required for producing the reflux by means of an extraneous cold source, for example cooling water. In addition, the parts of the apparatus necessarily present in the case of the known process, such as rectifying columns, condensers and evaporators, are also used in the refrigerant-generating process.

These and other objects and advantages of the invention will become more apparent from the following detailed description and appended claims taken in conjunction with the accompanying drawing in which:

FIG. 1 illustrates a block diagram showing the construction of a known deuterium exchange plant; and FIG. 2 illustrates a block diagram showing the combination according to the invention of a deuterium exchange plant and an absorption refrigerating plant.

Referring to FIG. 1, a known deuterium exchange plant includes an exchange tower 1, a rectifying column 2 for separating the water from the exchange medium, an evaporator 2a for producing a flow of rising vapor, a rectifying column 3 for separating the exchange medium from the water and a condenser 4 for producing the reflux liquid. A water soluble exchange medium and water are fed to the exchange tower 1 via the pipes 5 and 6 respectively to flow in countercurrent relation, the exchange tower 1 having different exchange stages in which the concentration of the medium having the lower deuterium concentration is increased.

For example, if methyl amine is used as the water-soluble exchange medium and has a higher deuterium concentration than the water which is introduced via the pipe 6 and which, for example, has only a natural deuterium concentration, then the deuterium content of the water in the exchange tower 1 is enriched while the deuterium content of the exchange medium is depleted.

Since the exchange medium is soluble in water, the more readily volatile exchange medium is separated from the water in the rectifying column 3.

The head product consisting of exchange medium is partly liquified in the condenser 4 which, for example, contains a cooler 4a through which cooling water flows, and the product is recycled as reflux to the column 3, while the vapor fraction of the exchange medium which, in this exemplified embodiment, has been depleted in deuterium content, is fed to a suitable destination via a pipe 7.

The exchange medium dissolved in the deuterium-enriched water in the exchange column 1 is separated from said water in the rectifying column 2 and then the bottom product consisting of enriched water is fed out of the plant via pipe 8. Some of the bottom product is used to produce the flow of the rising vapor by evaporation for example, by means of the evaporator, or heater 2a through which heating steam flows.

The column head product consists essentially of exchange medium in vapor form and is fed to the exchange tower 1 together with the exchange medium introduced via pipe 5.

The deuterium exchange plant shown in FIG. 2 consists of the same components as FIG. 1 but the rectifying column 3 for separating the exchange medium from the water requires a few more separating stages than the corresponding rectifying column 3 shown in FIG. 1. Since such rectifying columns are structures of simple construction, for example perforated or bubble tray columns, the extra expenditure for construction is relatively insignificant. Those parts of the deuterium exchange plant which correspond to FIG. 1 have therefore been given the same reference numerals as in FIG. 1. Also, the operation of the deuterium exchange process as shown in FIG. 2 is similar to that shown in FIG. 1 so that in order to avoid repetition no further details thereof will be given.

The apparatus also includes an absorption refrigeration plant connected with the exchange plant. As shown, the refrigeration plant includes a throttling means 10, evaporator 11 with a cold-consuming means 12, an absorption means 13 with a cooler 13a and a pump 14. The throttling means 10 is connected to the condenser 4 of the exchange plant while the absorption means 13 is connected via a pipe 6' to a supply of fresh water. The pump 14 has an outlet connected to the exchange tower 1 in a suitable manner.

The apparatus shown in FIG. 2 combines a refrigerating process with the deuterium exchange process as follows:

Some of the liquid consisting of exchange medium from the reflux condenser 4 is expanded in the throttling means 10 and evaporated in an evaporator 11 by heat exchange with the cold-consuming means 12, and then fed to the absorption means 13.

Water is injected into the absorption means 13 via the pipe 6' and the exchange medium is dissolved in this water to form a solution. The cooler 13a through which, for example, cooling water flows, serves to dissipate the solution heat formed during the absorption process.

When the solution has been brought to the deuterium exchange plant process pressure by means of the pump 14, the solution is fed from the absorption means 13 via a pipe 15 to the exchange tower 1 together with the bottom product from the rectifying column 3 which consists essentially of water.

A numerical example will now be given for methyl amine ($CH_3NH_2$) as the water soluble exchange medium.

The references $a - n$ in FIG. 2 denote those places where the variables, such as rate of flow, temperature, pressure, and deuterium concentration of the water exchange medium apply.

NUMERICAL EXAMPLE

| | Rate of flow per unit of time [Mol/s] | | | | | | $\frac{D}{D+H}$ [N] |
|---|---|---|---|---|---|---|---|
| | $H_2O$ Vapor | $CH_3NH_2$ Vapor | $H_2O$ Liquid | $CH_3NH_2$ Liquid | t [°C] | P [bar] | (1N=140 ppm) |
| a | — | 69 | — | — | 76 | 6.5 | 19.8 |
| b | — | — | 77 | — | 30 | 5.0 | 1.0 |
| c | — | — | 77 | $0.8\ 10^{-7}$ | 163.7 | 6.6 | 16.6 |
| d | $0.8\ 10^{-7}$ | 69 | — | — | 44 | 6.4 | 1.05 |
| e | $0.4\ 10^{-7}$ | 35 | — | — | −9 | 0.9 | 1.05 |
| f | — | — | 77 | 35 | 54 | 6.4 | 1.02 |
| g | — | — | 84 | 48 | 87 | 6.5 | 16.6 |
| h | 6 | 117 | — | — | 87 | 6.4 | 1.05 |
| i | — | 83 | 48 | 87 | 6.4 | 1.02 | |
| j | $1.2\ 10^{-7}$ | 118 | — | — | 44 | 6.4 | 1.05 |
| k | — | — | — | 14 | 44 | 6.4 | 1.05 |
| l | — | — | 6 | 13 | 57 | 6.4 | 1.05 |
| m | 7 | 48 | — | — | 102 | 6.5 | 16.6 |
| n | 7 | 117 | — | — | 87 | 6.5 | 18.5 |

With this numberical example, the evaporator 11 produces a refrigerating capacity of 724 kW at −9° C.

What is claimed is:

1. A process comprising the steps of
   creating an isotope exchange between water and a water soluble exchange medium, one of the water and exchange medium being deuterium enriched;
   rectifying the water and exchange medium after exchange to separate the water and exchange medium from each other;
   evaporating the separated water to form a flow of rising vapor;
   condensing the separated exchange medium to form a reflux liquid;
   expanding a portion of the condensed exchange medium to cool the exchange medium portion;
   placing the cooled exchange medium portion in heat exchange relation with a cold consumer to evaporate the exchange medium portion;
   forming a solution of the evaporate exchange medium portion and water;
   dissipating the solution heat generated upon formation of the solution; and
   supplying the solution as the water in said isotope exchange step at a predetermined pressure.

2. The combination of a deuterium exchange plant and an absorption refrigeration plant wherein said deuterium exchange plant includes at least one exchange tower for counter-current flow of water and a water soluble exchange medium, a first rectifying column connected to said tower for separating water from the exchange medium, an evaporator connected to said rectifying column for producing a flow of rising vapor, a second rectifying column connected to said tower for separating exchange medium from the water and a condenser connected to said second rectifying column for producing a reflux liquid consisting of exchange medium; and wherein said absorption refrigeration plant includes a throttling means connected to said condenser to expand a flow of liquid exchange medium flowing from said condenser, a second evaporator for evaporating the expanded flow of exchange medium, placing the cooled heat exchange medium portion with a cold consumer device, an absorption means for comingling the evaporated exchange medium from said second evaporator and water to form a solution, a cooling means connected to said absorption means for dissipating solution heat and a pump connected between said absorption means and said tower of said deuterium exchange plant for pumping the solution to said tower at a predetermined pressure.

* * * * *

UNITED STATES PATENT AND TRADEMARK OFFICE
CERTIFICATE OF CORRECTION

PATENT NO. : 3,986,343
DATED : October 17, 1976
INVENTOR(S) : MEHMET SAHABETTIN ERGENC It is certified that error appears in the above-identified patent and that said Letters Patent are hereby corrected as shown below:

In the Numerical Example, in the first column designated with letters, delete the entire line beginning with "i" and insert the following:

-- i    -    -    83    48    87    6.4    1.02 --

Signed and Sealed this

Eleventh Day of January 1977

[SEAL]

*Attest:*

RUTH C. MASON
*Attesting Officer*

C. MARSHALL DANN
*Commissioner of Patents and Trademarks*